US011912544B2

(12) United States Patent
Bogart

(10) Patent No.: US 11,912,544 B2
(45) Date of Patent: Feb. 27, 2024

(54) LINE ROLLER ASSEMBLY

(71) Applicant: Michael M. Bogart, Boynton Beach, FL (US)

(72) Inventor: Michael M. Bogart, Boynton Beach, FL (US)

( * ) Notice: Subject to any disclaimer, the term of this patent is extended or adjusted under 35 U.S.C. 154(b) by 268 days.

(21) Appl. No.: 17/325,305

(22) Filed: May 20, 2021

(65) Prior Publication Data

US 2022/0250884 A1 Aug. 11, 2022

Related U.S. Application Data

(60) Provisional application No. 63/146,736, filed on Feb. 8, 2021.

(51) Int. Cl.

*B66D 3/04* (2006.01)
*B66D 3/20* (2006.01)
*B66D 3/26* (2006.01)

(52) U.S. Cl.

CPC ................. *B66D 3/04* (2013.01); *B66D 3/20* (2013.01); *B66D 3/26* (2013.01); *B66D 2700/025* (2013.01); *B66D 2700/026* (2013.01)

(58) Field of Classification Search

CPC ... B66D 1/28; B66D 1/30; B66D 1/36; B66D 3/04; B66D 3/26; B66D 2700/026; B66C 23/20; B66C 23/26; B66C 23/208; B66B 9/187; F16H 7/20; E04G 21/3242; E04G 21/3276; E04G 3/34; E04G 7/06; E04G 7/08; E04G 7/12; E04G 7/18; A62B 35/0068; A62B 35/0093; A62B 1/06; A62B 1/08; A62B 1/18; A62B 29/02; B23Q 3/00; B23Q 3/152

(Continued)

(56) References Cited

U.S. PATENT DOCUMENTS 1,247,706 A * 11/1917 Moran .................... B66C 23/20
182/145
4,234,055 A * 11/1980 Beeche ..................... E04G 3/34
182/150

(Continued)

FOREIGN PATENT DOCUMENTS

CN 202202558 U * 4/2012
CN 104545681 A * 4/2015

(Continued)

*Primary Examiner* — Michael R Mansen
*Assistant Examiner* — Henrix Soto
(74) *Attorney, Agent, or Firm* — Michael J. Corrigan

(57) ABSTRACT

A line roller assembly is provided including a base assembly including a clamping assembly configured to clamp the base assembly to a parapet wall surrounding a roof of a structure or other installation, a carriage assembly slidably mounted on the base assembly, said carriage assembly including at least one arm including a roller at a distal end, said carriage assembly movable between at least one extended position and a medial position, and said at least one roller includes a groove configured to receive a line for aiding the line over the parapet wall, wherein in the at least one extended position the at least one arm extends a pre-determined distance over an edge of an outer wall of the structure or the at least one arm extends a pre-determined distance over an inner edge of the parapet wall of the structure over the roof.

16 Claims, 4 Drawing Sheets

(58) Field of Classification Search
USPC .......................................................... 254/409
See application file for complete search history.

(56) References Cited

U.S. PATENT DOCUMENTS

| | | | | | |
|---|---|---|---|---|---|
| 4,828,073 | A * | 5/1989 | Friday | E04G 3/28 182/36 |
| 5,065,838 | A * | 11/1991 | Finley | E04G 3/34 182/150 |
| 5,265,742 | A * | 11/1993 | Stenger | B66C 23/205 182/60 |
| 6,135,300 | A * | 10/2000 | Fox | B66C 23/208 182/60 |
| 6,595,508 | B2 * | 7/2003 | Duncan | B25B 5/10 269/43 |
| 6,910,678 | B2 * | 6/2005 | Small | B66D 1/28 254/334 |

FOREIGN PATENT DOCUMENTS

| | | | |
|---|---|---|---|
| CN | 106006498 | A * | 10/2016 |
| CN | 205875669 | U * | 1/2017 |
| WO | WO-2018145226 | A1 * | 8/2018 |

* cited by examiner

LINE ROLLER ASSEMBLY

RELATED APPLICATIONS

This application claims benefit of U.S. provisional patent application No. 63/146,736 filed on Feb. 8, 2021.

FIELD OF THE INVENTION

The present invention relates to construction equipment and tools, and more particularly, to an improved line roller assembly for aiding in hoisting or lowering lines, cables or cords to a roof of a structure, tower, scaffolding or other installation.

BACKGROUND OF THE INVENTION

Line rollers for use on rooftops or other installations for aiding in hoisting, moving or lowering lines, cables or cords are known on the art. Some drawbacks of prior art line rollers being used on a structure, for example, are that the lines, cables or cords being directed over the parapet wall of the structure or over other components of a building or structure and over the rollers of the line roller onto the roof or to the ground below are not directed far away from the exterior wall of the structure extending from the roof to the ground below. As such, the lines, cables or cords often rub against the outer wall which may be several tens or hundreds of feet making it difficult for the lines, cables or cords to be directed over the rollers and the parapet walls. Such outer walls often include doors, windows, balconies and other obstructions the lines, cable or cords may get hung up on as well. As such, there is a need in the art for a line roller that eliminates the aforementioned drawbacks.

SUMMARY OF THE INVENTION

In an embodiment, there is provided a line roller assembly including a base assembly including a clamping assembly configured to clamp the base assembly to a parapet wall surrounding a roof of a structure or other installation, a carriage assembly slidably mounted on the base assembly, said carriage assembly including at least one arm including a roller at a distal end, said carriage assembly movable between at least one extended position and a medial position, and said at least one roller includes a groove configured to receive a line for aiding the line over the parapet wall, wherein in the at least one extended position the at least one arm extends a pre-determined distance over an edge of an outer wall of the structure or the at least one arm extends a pre-determined distance over an inner edge of the parapet wall of the structure over the roof.

In an embodiment, there is provided a line roller assembly, including a base assembly including a clamping assembly configured to clamp the base assembly to a parapet wall surrounding a roof of a structure or other installation, and a carriage assembly slidably mounted on the base assembly, said carriage assembly including a pair of opposing arms each arm including a roller at a distal end, said carriage assembly movable between opposing first and second extended positions and a medial position, and said rollers each have a groove configured to receive a line for aiding the line over the parapet wall, wherein in a first extended position one of the arms extends a pre-determined distance over an edge of an outer wall of the structure.

In an embodiment, there is provided a line roller assembly, including a base assembly including a clamping assembly configured to clamp the base assembly to an attachment point on an installation, a carriage assembly slidably mounted on the base assembly, said carriage assembly including a pair of opposing arms each arm including a roller at a distal end, said carriage assembly movable between opposing first and second extended positions and a medial position, and said rollers each have a groove configured to receive a line for aiding the line over a top of the line roller assembly and the attachment point of the installation, wherein in a first extended position one of the arms extends a pre-determined distance from the medial position of the carriage assembly.

DETAILED DESCRIPTION

Figure 1:
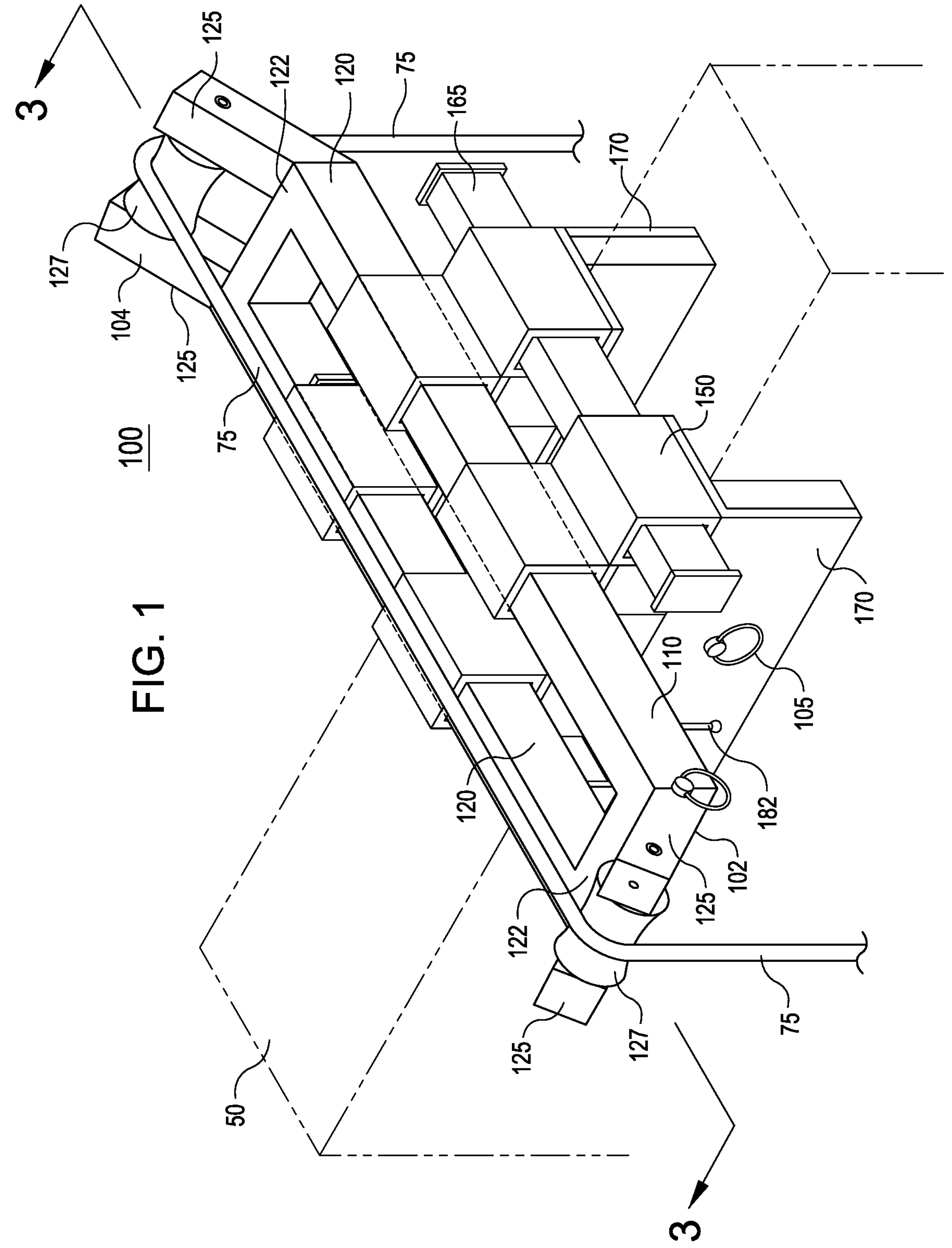
FIG. 1 is a front elevated perspective view of a line roller assembly according to an embodiment of the present invention.

Referring now to FIG. 1, there is illustrated an embodiment of a line roller assembly 100 for attachment to a wall including, but not limited to, a parapet wall 50 surrounding the roof (not shown) of the outer walls of a structure (not shown) such as an office building, condo, hospital, tower, scaffolding or other installation. The line roller assembly 100 is clamped onto the parapet wall 50 with a pair of opposing clamping plates 170 (described in more detail hereinbelow) so that one end or first end 102 faces outwardly from an outer edge of the parapet wall 50 with the ground a distance below. The opposing end or second end 104 faces inwardly from an inner edge of the parapet wall 50 towards the roof and is elevated above the roof substantially the same distance the parapet wall 50 extends above the roof.

It is known in the industry that lines, cables, wires, ropes or cords (hereinafter "line") like the line 75 illustrated in FIG. 1 used in building construction can be several hundred feet in length for use on buildings hundreds of feet in height. As such, these lines 75 can be quite heavy and bulky and a line roller like the embodiment of the improved line roller assembly 100 illustrated herein is essential for aiding in moving these lines 75 over the inner and outer edges and top of the parapet wall 50. Such lines 75 may include braided steel line used for hauling heavy items from the ground onto the roof and cables or power cords of 110V, 220V, and 440V or any voltage for powering tools or equipment on the roof.

Figure 2:
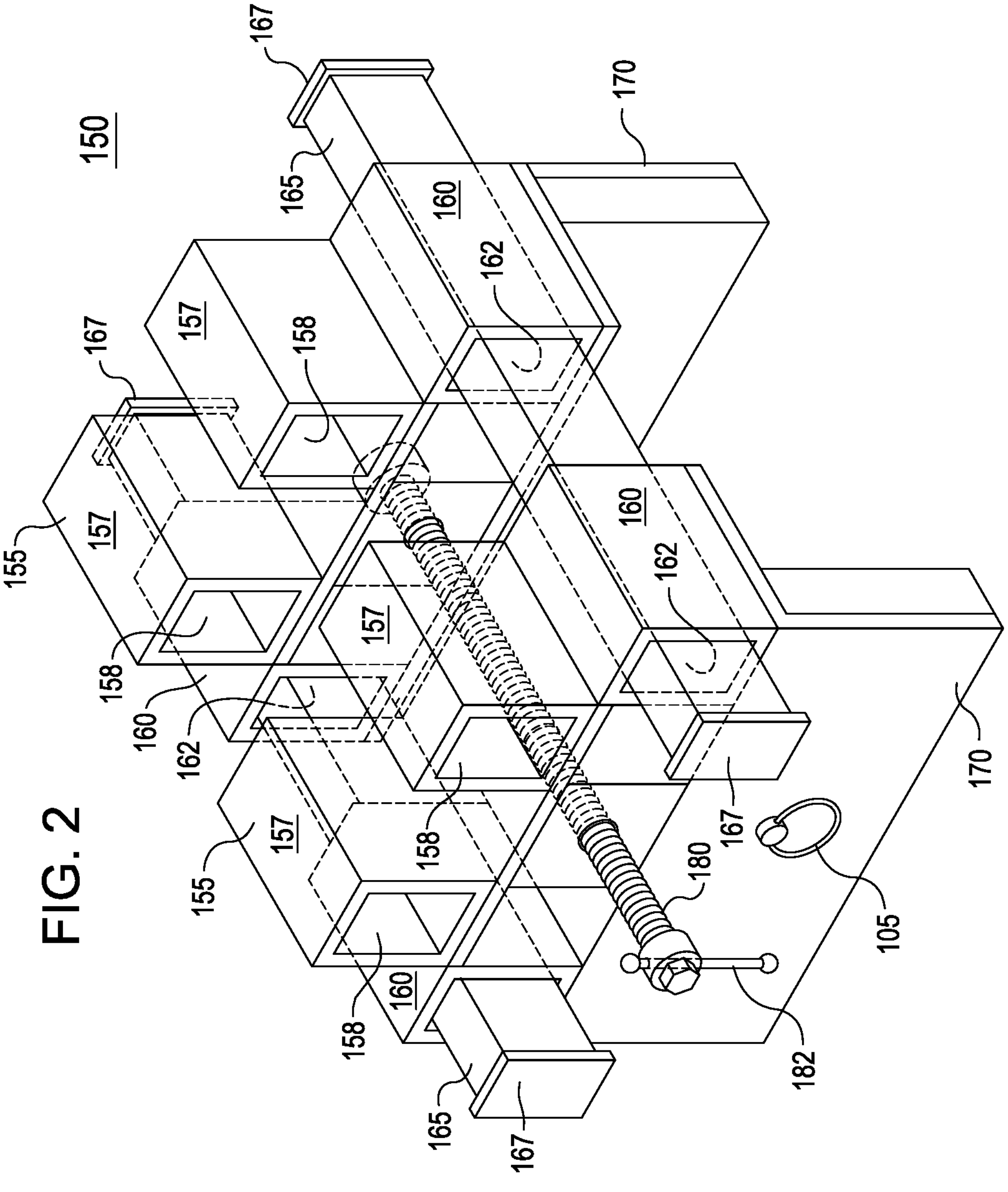
FIG. 2 is an enlarged perspective view of the base of the line roller assembly illustrated in FIG. 1.

Referring now also to FIG. 2, a carriage assembly 110 is slidingly mounted on a base assembly 150 (illustrated in FIG. 2 without the carriage assembly 110). The carriage assembly 110 includes a pair of guide rails 120, 120 opposed from one another and interconnected near their opposing ends by a cross members 122, 122. Note that the materials comprising the carriage assembly 110 of the line roller 100 assembly including the guide rails 120, 120 and the cross-members 122, 122 at opposing ends interconnecting the guide rails 120, 120 are disclosed as square metal tubing but any suitable material of another cross-section may be used and any material and shape of the cross-members 122, 122 may be used. Connected at each of the four ends of the guide rails 120, 120 forming the carriage assembly 110 of the line roller assembly 100 are upwardly angled arm sections 125 arranged in opposing pairs and formed by like materials as the guide rails 120, 120. A roller 127 is mounted on an axle disposed between each pair of opposing arm sections 125 on each of the distal ends of the carriage assembly 110.

In use, the rollers 127 are free to roll on their axes when a line 75 is laid in a groove formed in each of the rollers 127. As such, the line 75 is free to roll within the groove of the rollers 127 and move unobstructed over the parapet wall 50 as it is being unreeled from a cord reel (not shown) disposed on the ground outside the wall and pulled onto the roof surface for installation on or use on the roof for powering equipment on the roof or for powering tools and equipment on the roof from a power source disposed on the ground or other location. Oppositely, the line 75 is free to move unobstructed over the parapet wall on the rollers 127 as it is being unreeled from a line reel disposed on the roof and pulled directed over the rollers 127 and the parapet wall 50 to the ground below.

The base assembly 150 includes a pair of opposing guide rail guide assemblies 155 each having a pair of opposing guide rail guides 157 slidingly receiving the guide rails 120 through channels 158 formed therein. Each of the guide rail guides 157 include an alignment guide rail guide 160 attached thereto and disposed beneath and outwardly therefrom. Each of the alignment guide rail guides 160 include a channel 162 formed therein for slidingly receiving an alignment guide rail 165 therein as described more fully hereinbelow.

Figure 3:
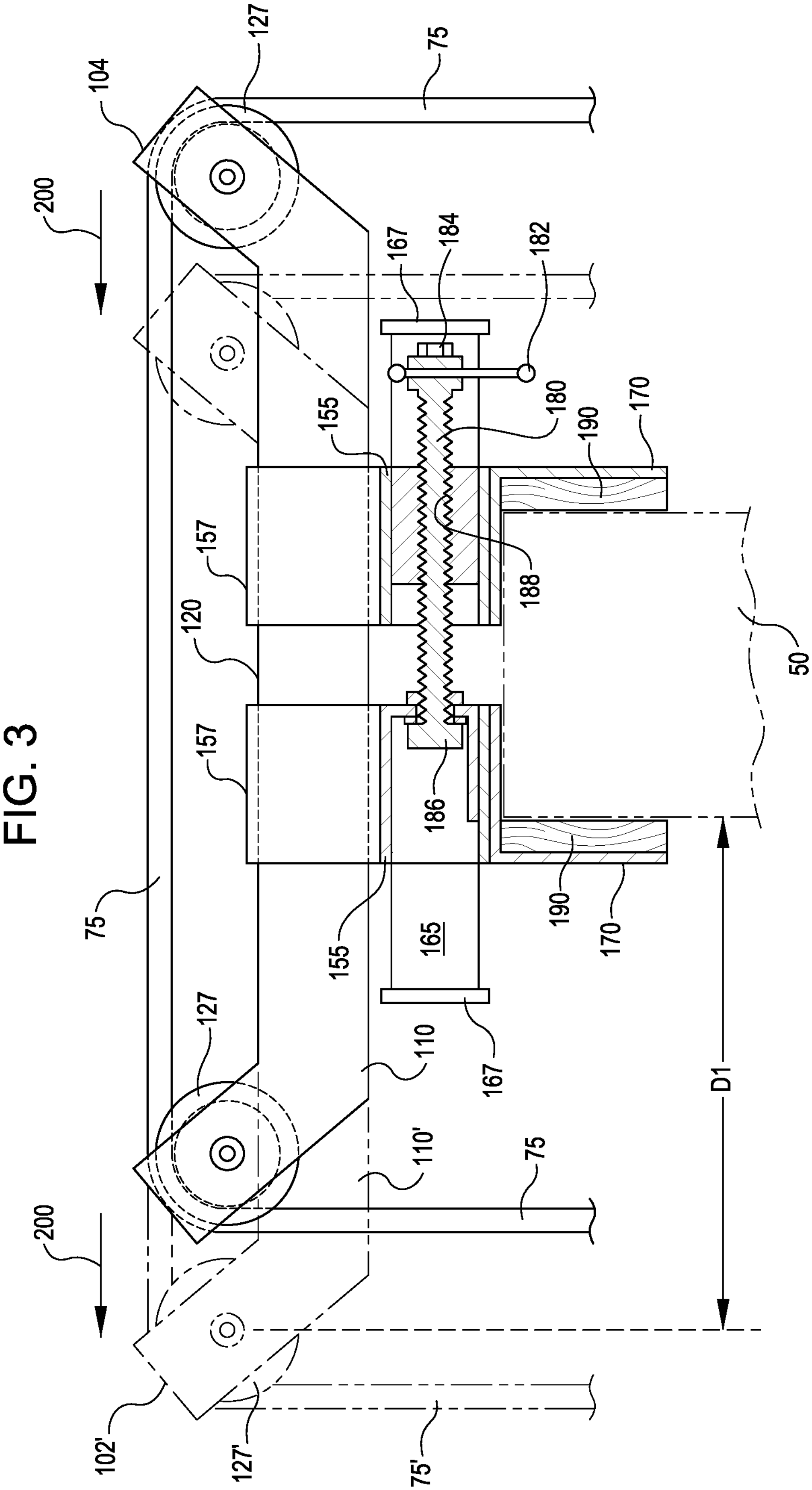
FIG. 3 is a side cross-sectional view of the line roller assembly taken along line 3-3 of FIG. 1 illustrating movement of the carriage assembly on the base assembly from a medial position illustrated in solid lines to a first use position illustrated in phantom lines.
Figure 4:
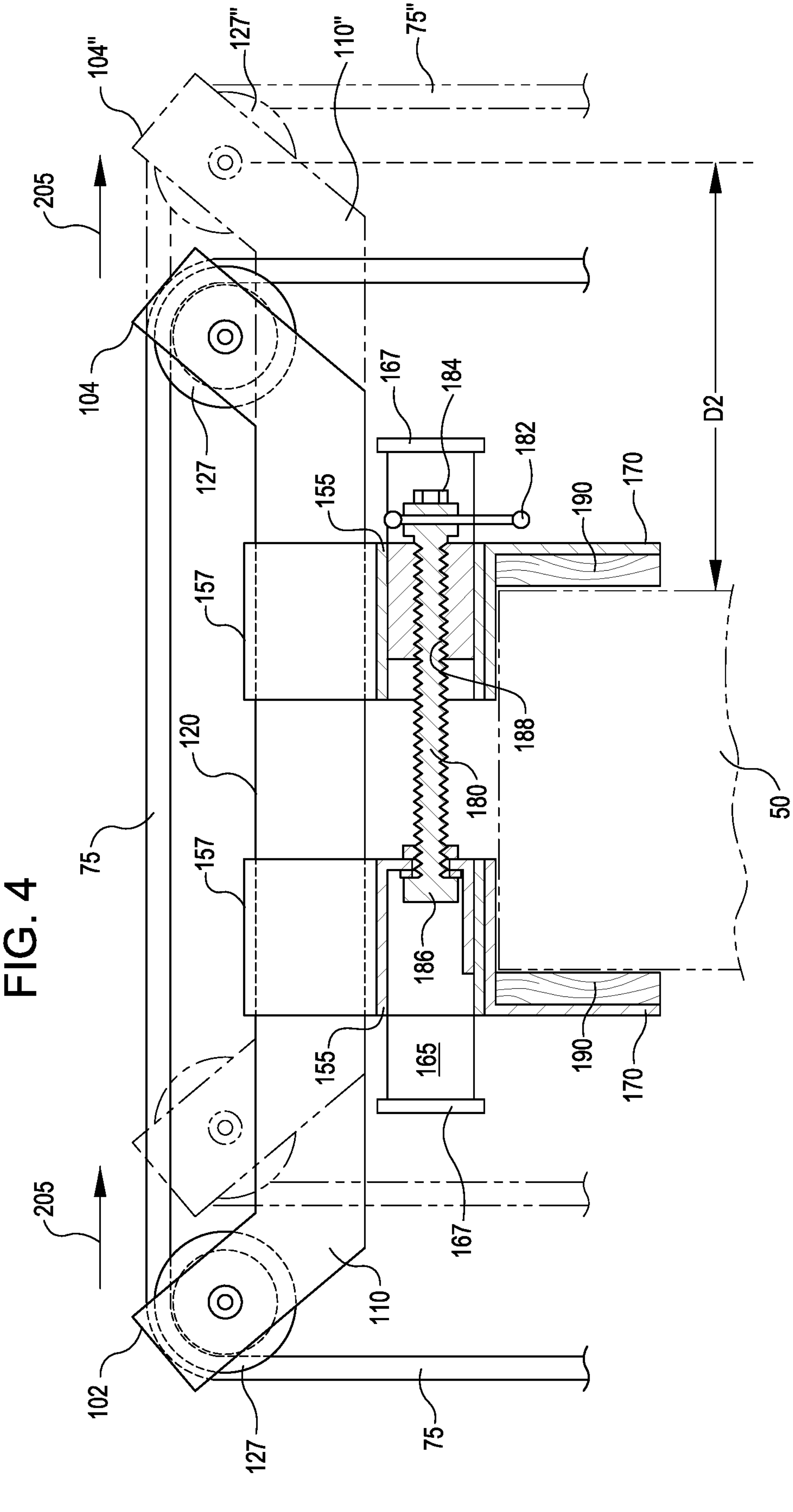
FIG. 4 is another side cross-sectional view of the line roller assembly taken along line 3-3 of FIG. 1 illustrating movement of the carriage assembly on the base assembly from the medial position illustrated in solid lines to a second use position shown in phantom lines.

Referring now also to FIGS. 3 and 4, each of the opposing guide rail guide assemblies 155 include a downwardly extending clamping plate 170 for clamping the line roller assembly 100 to the parapet wall 50 during use. A piece of wood 190 such as a 1-inch×6-inch, 1-inch×8-inch or 1-inch×12-inch sizes or hard rubber or padding of suitable length typically may be inserted between each of the clamping plates 170 and the parapet wall 50 to cushion the softer parapet wall 50 typically covered with stucco from damage from the harder clamping plates 170. A threaded rod 180 of a threaded rod clamping assembly is disposed beneath the guide rails 120 and may be rotated in a first direction to either cause the guide rail guide assemblies 155 to be urged towards one another to cause the clamping plates 170 to clamp to the parapet wall 50 to secure the liner roller assembly 100 to the parapet wall 50 or rotated in the opposite or second direction to release the clamping plates 170 and the line roller assembly 100 from the parapet wall 50 after use.

Referring now specifically to FIGS. 3 and 4, details of the threaded rod clamping assembly disposed beneath the guide rails guides 157 may be discerned. At the working end of the threaded rod 180 of the threaded rod clamping assembly is a handle 182 which may be used to manually rotate the threaded rod 180 to cause the clamping plates 170 to be urged toward each other to clamp the line roller assembly 100 to the parapet wall 50 or to manually rotate the threaded rod 180 in the opposite direction to release the clamping plates 170 and the line roller assembly 100 from the parapet wall 50. The handle 182 may be affixed to the threaded rod 180 by any suitable means including being fitted through an aperture in a sliding arrangement or welding and there may be a connector 184 such as a welded hex nut or other attachment means affixed to one end of the threaded rod 180 for attaching a rotating power source (not shown) to the connector 184 to rotate the threaded rod 180 in either direction for clamping or releasing the line roller assembly 100 to the parapet wall 50. The opposite end of the threaded rod 180 is affixed in a swivel fashion with a swivel joint 186 to one of the opposing guide rail guide assemblies 155 and a portion of the threaded rod 180 is inserted through a threaded bore 188 formed in the opposing guide rail guide assembly 155 such that the parapet wall 50 and wood portions 190 or other padding are sandwiched between the clamping plates 170. As such, as the threaded rod 180 is turned in a first direction the clamping plates 170 are urged toward one another in a clamping action that causes the clamping plates 170 to clamp to the parapet wall 50 and when the threaded rod 180 is rotated in a second opposite direction the clamping plates 170 are released from the parapet wall 50.

It was discovered that during the rotation of the threaded rod 180 in either direction during installation or removal of the line roller assembly 100 that a torqueing action on the line roller assembly 100 causes friction and misalignment of the guide rails 120 and the guide rail guide assemblies 155 making installation or removal of the line roller assembly 100 from the parapet wall 50 difficult. To overcome this torqueing action, and as previously, discussed, extending outwardly from and beneath each of the guide rail guides 157 is an alignment guide rail guide 160. Each of the alignment guide rail guides 160 include a channel 162 formed therein for slidingly receiving an alignment guide rail 165. The alignment guide rail 165 ensures precise alignment of the guide rail guides 157 as the guide rails 120 are slidingly moved within the guide rail guides 157 when the clamping plates 170 are urged toward or away from the parapet wall 50. Each of the alignment guide rails 165 includes a cap 167 at each end to ensure the alignment rail guides 160 are maintained within the translatable distance of their respective alignment guide rail 165.

In an embodiment, the line roller assembly 100 may include a safety ring 105 or other attachment point affixed to one of the clamping plates 170, guide rails 120 or other attachment point for attachment to a safety line (not shown) which may be attached to the roof, parapet wall 50 or other fixed attachment point to prevent the line roller assembly 100 from falling from the parapet wall 50 to the ground below possible damaging the line roller assembly 100, the outer wall of the structure, or hurting persons or property on the ground below.

The foregoing arrangement facilitates extending the carriage assembly 110 and roller 127 (in the direction of arrows 200) on the first end 102 of the line roller assembly 100 from a medial position on the base assembly 150 by guide rails 120 sliding within guide rail guides 157 to a desirable intended first use position (illustrated in phantom lines in FIG. 3 as carriage assembly 110' and roller 127') a predetermined di stance D1 away from the outer edge of the parapet wall 50 and the outer wall of the structure to prevent the line 75' being hoisted onto or from the roof from contacting the outer wall causing the aforementioned problems. For example, when the carriage assembly 110 is moved to the intended first use position the pre-determined distance D1 from the outer edge of the parapet wall 50 and the outer wall of the structure to the axis of the roller 127 may be in the range of zero inches to six inches, twelve inches, eighteen inches up to twenty-four inches or more if properly designed to carry the load. Oppositely, the carriage assembly 110 and roller 127 may be extended (in the direction of arrows 20) on the second end 104 of the line roller assembly 100 from a medial position on the base assembly 150 by guide rails 120 sliding within guide rail guides 157 to a desirable intended second use position (illustrated in phantom lines in FIG. 4 as carriage assembly 110" and roller 127") a pre-determined distance D2 away from the inner edge of the parapet wall 50 and over the surface of the roof to prevent the line 75 being hoisted onto or from the roof from contacting the inner edge of the parapet wall 50 causing the aforementioned problems. For example, when the carriage assembly 110 is moved to the intended second use position the pre-determined distance D2 over the roof from the inner edge of the parapet wall 50 to the axis of the roller 127 may be in the range of zero inches to six inches, twelve inches, eighteen inches up to twenty-four inches or more if properly designed to carry the load.

In an embodiment, a latch or lock (not shown) may be used to lock the carriage assembly 110 of the line roller assembly 100 into position on the base assembly 150 that is most suitable for one of the first and second intended use positions or other contemplated intended use positions most beneficial to prevent the line 75 from contacting the inner edge of the parapet wall 50, outer wall of the structure, or other possible obstacles that may prevent the unobstructed hoisting of the line 75 onto or from the roof of the structure.

In other embodiments of the invention, the guide rollers 127 may be motorized to assist in causing the line 75 to or from the roof. There may be a cap or enclosure (not shown) that goes over the line roller assembly 100 to prevent the line 75 from slipping within the grooved sections of the rollers 127.

In other embodiments, there may additional rollers located parallel to the rollers 127 for additional lines that may be needed to be brought from a cable roller on the ground to the roof or oppositely from the roof to the ground below.

Thus, there has been shown and described several embodiments of a line roller assembly. As is evident from the foregoing description, certain aspects of the present invention are not limited by the particular details of the examples illustrated herein, and it is therefore contemplated that other modifications and applications, or equivalents thereof, will occur to those skilled in the art. The terms “having” and “including” and similar terms as used in the foregoing specification are used in the sense of “optional” or “may include” and not as “required”. Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device, comprising:

a base assembly including a clamping assembly configured to clamp the base assembly to a parapet wall surrounding a roof of a structure; and a carriage assembly slidably mounted on the base assembly, the carriage assembly further comprising a pair of parallel guide rails interconnected at opposing ends by cross-members; said carriage assembly including at least one arm including a roller at a distal end attached to a cross-member, said carriage assembly movable between at least one extended position and a medial position, and said at least one roller includes a groove configured to receive a non-integral line for aiding the line over the parapet wall;

the base assembly further comprising a pair of opposing guide rail guide assemblies each having a pair of opposing guide rail guides each having a channel formed therein, and the carriage assembly further comprising a pair of guide rails that are slidingly received in the channels such that the carriage assembly may slidingly move within the channels relative to the base assembly;

each of the guide rail guides further includes a pair of opposing alignment guide rail guides attached thereto and disposed beneath and outwardly therefrom, and each of the alignment guide rail guides include a channel formed therein for slidingly receiving an alignment guide rail therein configured to maintain alignment of the carriage assembly as the carriage assembly slides relative to the base assembly;

wherein in the at least one extended position the at least one arm extends a pre-determined distance over an edge of an outer wall of the structure or the at least one arm extends a pre-determined distance over an inner edge of the parapet wall of the structure over the roof.

2. The device of claim 1, the base assembly further comprising a pair of opposing clamping plates configured to clamp to and be released from the parapet wall using a threaded rod that engages a threaded bore in one of the clamping plates and a swivel joint attached to the other of the clamping plates, and the clamping plates are urged toward one another when the threaded rod is rotated in a first direction and are urged away from each other when the threaded rod is rotated in a second direction.

3. The device of claim 2, the threaded rod further including a handle on one end for grasping and rotating the threaded rod in either of the first or second directions.

4. The device of claim 2, further including a connector affixed to one end of the threaded rod for attachment to a rotary power source to rotate the threaded rod in the first or second direction.

5. The device of claim 1, the alignment guide rails further include a cap at each end configured to maintain the alignment guide rails within the alignment guide rail guides.

6. The device of claim 1, further including a safety ring attached to one of the carriage assembly or base assembly for attachment to a safety line which is attached to the structure.

7. A line roller assembly, comprising:

a base assembly including a clamping assembly configured to clamp the base assembly to a parapet wall surrounding a roof of a structure; and a carriage assembly slidably mounted on the base assembly, said carriage assembly including a pair of opposing arms each arm including a roller at a distal end, said carriage assembly movable between opposing first and second extended positions and a medial position, and said rollers each have a groove configured to receive a line for aiding the line over the parapet wall;

the base assembly further comprising a pair of opposing guide rail guide assemblies each having a pair of opposing guide rail guides each having a channel formed therein, and the carriage assembly further comprising a pair of guide rails that are slidingly received in the channels such that the carriage assembly may slidingly move within the channels relative to the base assembly, each of the guide rail guides further includes a pair of opposing alignment guide rail guides attached thereto and disposed beneath and outwardly therefrom, and each of the alignment guide rail guides include a channel formed therein for slidingly receiving an alignment guide rail therein configured to maintain alignment of the carriage assembly as the carriage assembly slides relative to the base assembly;

wherein in the first extended position one of the arms extends a pre-determined distance over an edge of an outer wall of the structure.

8. The assembly of claim 7, the base assembly further comprising a pair of opposing clamping plates configured to clamp to and be released from the parapet wall using a threaded rod that engages a threaded bore in one of the clamping plates and a swivel joint attached to the other of the clamping plates, and the clamping plates are urged toward one another when the threaded rod is rotated in a first direction and are urged away from each other when the threaded rod is rotated in a second direction.

9. The assembly of claim 8, the threaded rod further including a handle on one end for grasping and rotating the threaded rod in either of the first or second directions.

10. The assembly of claim 8, further including a connector affixed to one end of the threaded rod for attachment to a rotary power source to rotate the threaded rod in the first or second direction.

11. The assembly of claim 7, the alignment guide rails further include a cap at each end configured to maintain the alignment guide rails within the alignment guide rail guides.

12. The assembly of claim 7, further including a safety ring attached to one of the carriage assembly or base assembly for attachment to a safety line which is attached to the structure.

13. A line roller assembly, comprising:

a base assembly including a clamping assembly configured to clamp the base assembly to an attachment point on an installation; and a carriage assembly slidably mounted on the base assembly, said carriage assembly including a pair of opposing arms each arm including a roller at a distal end, said carriage assembly movable between opposing first and second extended positions and a medial position, and said rollers each have a groove configured to receive a non-integral line for aiding the line over a top of the line roller assembly and the attachment point of the installation;

the base assembly further comprising a pair of opposing guide rail guide assemblies each having a pair of opposing guide rail guides each having a channel formed therein, and the carriage assembly further comprising a pair of guide rails that are slidingly received in the channels such that the carriage assembly may slidingly move within the channels relative to the base assembly;

each of the guide rail guides further includes a pair of opposing alignment guide rail guides attached thereto and disposed beneath and outwardly therefrom, and each of the alignment guide rail guides include a channel formed therein for slidingly receiving an alignment guide rail therein configured to maintain alignment of the carriage assembly as the carriage assembly slides relative to the base assembly;

the base assembly and the carriage assembly collectively forming a permanently assembled, portable, hand-carried line roller assembly for attachment to the attachment point of the installation;

wherein in the first extended position one of the arms extends a pre-determined distance from the medial position of the carriage assembly.

14. The line roller assembly of claim 13, the base assembly further comprising a pair of opposing clamping plates configured to clamp to and be released from the attachment point of the installation using a threaded rod that engages a threaded bore in one of the clamping plates and a swivel joint attached to the other of the clamping plates, and the clamping plates are urged toward one another when the threaded rod is rotated in a first direction and are urged away from each other when the threaded rod is rotated in a second direction.

15. The line roller assembly of claim 13, the alignment guide rails further include a cap at each end configured to maintain the alignment guide rails within the alignment guide rail guides.

16. The line roller assembly of claim 14, the threaded rod further including a handle on one end for grasping and rotating the threaded rod in either of the first or second directions.

* * * * *